Dec. 17, 1940.  S. MILLER  2,225,074
SEAT ADJUSTER
Filed Oct. 13, 1937  2 Sheets-Sheet 1
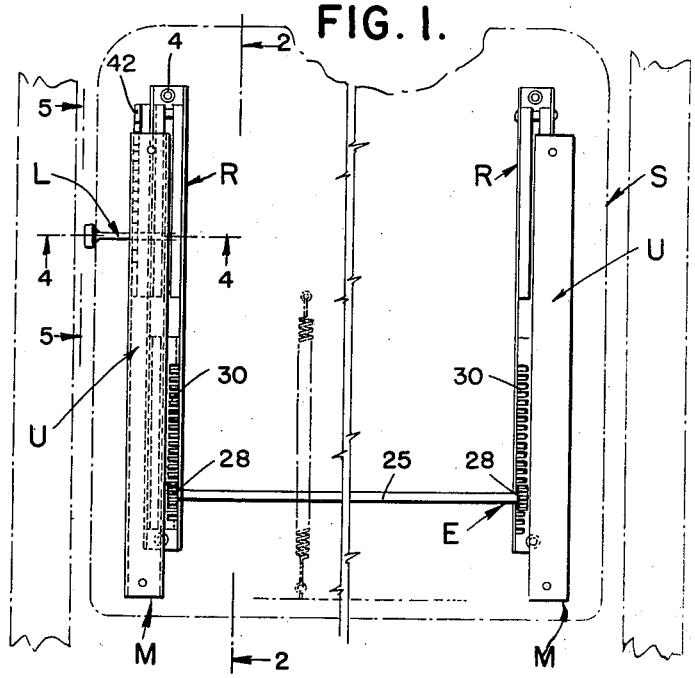
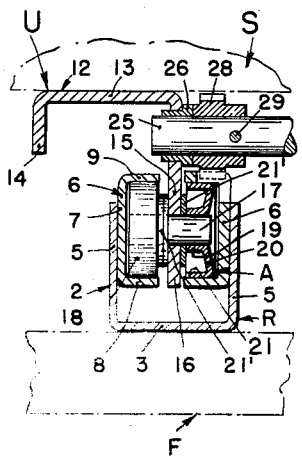
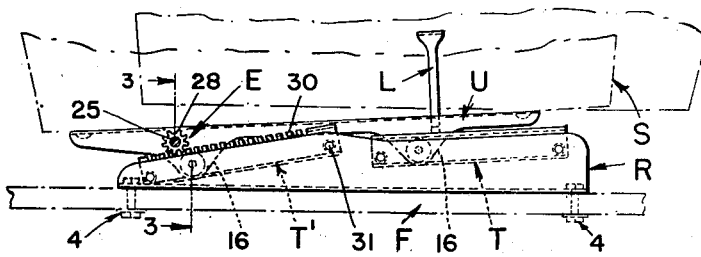
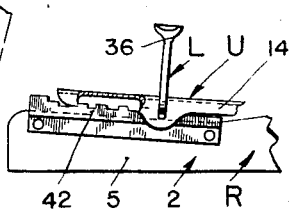
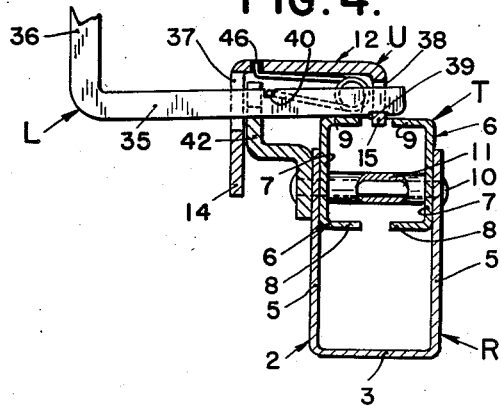
INVENTOR
SWIFT MILLER
BY John W. Michael
ATTORNEY Dec. 17, 1940.                S. MILLER                2,225,074
                             SEAT ADJUSTER
                       Filed Oct. 13, 1937            2 Sheets-Sheet 2
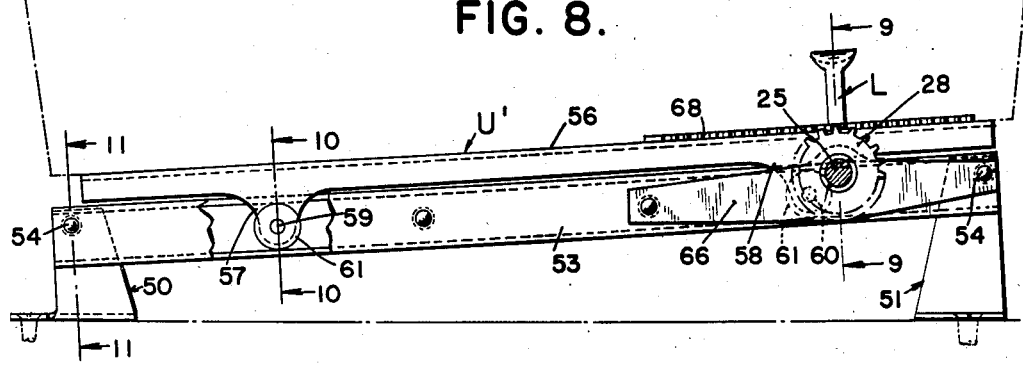
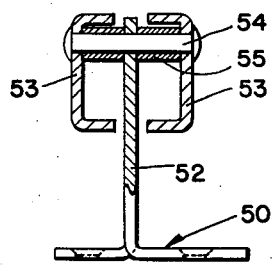
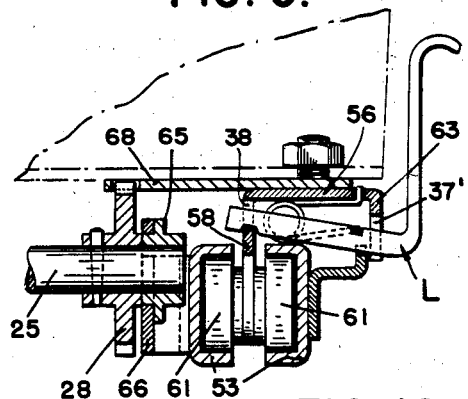
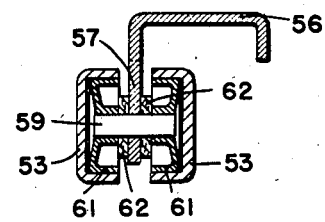
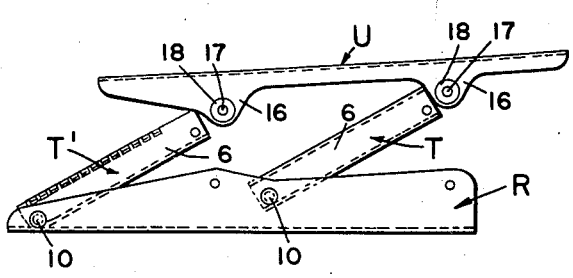
INVENTOR
SWIFT MILLER
BY John W. Michael
ATTORNEY Patented Dec. 17, 1940

2,225,074

UNITED STATES PATENT OFFICE 2,225,074

SEAT ADJUSTER

Swift Miller, Wauwatosa, Wis., assignor to E. R. Wagner Manufacturing Company, Milwaukee, Wis., a corporation of Wisconsin Application October 13, 1937, Serial No. 168,689

14 Claims. (Cl. 155—14)

This invention relates in general to adjustable seats for automobiles or the like and more particularly to a novel means for adjustably mounting such a seat and securing it in its various adjusted positions.

One of the objects of the invention is to provide a seat mounting of this character which is so constructed and organized that the elements of the mounting which move relative to each other when the seat is adjusted have rolling friction contact, metal to metal sliding contact of any of the parts of the seat when the seat is adjusted being avoided.

Another object of the invention is to provide a seat mounting of this character and having these advantages and which is simple and durable in its construction, compactly organized, susceptible of convenient and economical production, and adapted to be readily and easily installed.

Another object of the invention is to provide a seat mounting which is adjustable to provide for a reclining position for country driving and an erect position for city driving, the seat being tilted at different angles in its different fore and aft adjustments. Moreover, the extent to which the seat is tilted as it is adjusted forwardly and rearwardly may be readily varied by changing the relative position of the parts. The necessity of reshaping or changing the elements themselves is avoided and hence it is not necessary to provide different or new dies or tools for seat mountings which tilt the seat to different angles.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 1 is a plan view of a seat mounting embodying the present invention;

Figure 2 is a view thereof in side elevation;

Figure 3 is a view in transverse cross section taken on line 3—3 of Figure 2;

Figure 4 is a similar view in vertical cross section taken on line 4—4 of Figure 1;

Figure 5 is a fragmentary view in side elevation and partly broken away and shown in vertical section to illustrate the construction of the latch for securing the seat in its various adjusted positions;

Figure 6 is a detail plan view of the latch spring;
Figure 7 is a view in elevation illustrating the manner in which certain of the elements of the seat mounting are assembled;

Figure 8 is a view in side elevation showing a simplified type of seat mounting embodying certain features of the present invention and with parts broken away for the sake of illustration; and Figures 9, 10 and 11 are views in transverse vertical cross section taken on lines 9—9, 10—10 and 11—11 respectively of Figure 8.

Referring to the drawings and more particularly to Figures 1 to 7 inclusive, the floor boards of an automobile or similar vehicle are indicated diagrammatically at F and the seat proper, usually the front seat of the automobile, at S. Interposed between the seat S and the floor boards F are a pair of seat mounting units designated generally at M, one such unit being provided adjacent each side of the seat and the units M extending longitudinally of the seat and parallel to each other.

The mounting units M are of identical construction and each generally comprises a floor rail R, front and rear tracks T and T' supported on the floor rail, an upper or seat rail U, roller arrangements A carried by the seat rail and riding on the tracks T and T', latching means L for releasably securing the seat in various adjustments and an equalizer E for the two mounting units M.

Each floor rail R comprises a sheet metal channel designated generally at 2 and having its body portion or base 3 resting flatly on the floor boards and secured thereto by suitable fastening devices such as bolts and nuts 4 which co-act with the end portions of the floor rail as shown in Figure 2. Each channel 2 which constitutes a floor rail has vertical side flanges 5 integral with its base or body portion 3.

The longitudinally spaced tracks T and T' provided on each floor rail are of substantially the same construction although disposed at slightly different angles. Each track is made up of a pair of confronting sheet metal channels designated at 6. The channels 6 are of similar construction though oppositely arranged and each has a body portion 7, a lower flange 8, and an upper flange 9. The body portions 7 of the channel 6 engage the inner faces of the side members 5 of their floor rail 2 and they are secured in position by means of rivets 10 and spacers 11, the spacers surrounding the rivets and having their ends engaging the inner faces of the channel 6.

The upper or seat rail U embodied in each seat mounting is also preferably in the form of a shallow inverted channel 12 having its body portion 13 fastened to the bottom of the seat and having depending side flanges 14 and 15. Each flange 15 is provided with spaced depending extensions 16. Each extension 16 is provided with an opening to receive the central portion of an axle 17. The rollers 18 of the roller arrangements are rotatably mounted on the ends of the axles 17 and are disposed between the upper and lower flanges of the channel 6 of the tracks T and T'. Each roller 18 is preferably stamped from sheet metal and has a hub 19 fitted over its axle 17, an inwardly dished body portion 20, and a circular tread portion 21. Ordinarily the rollers 18 have rolling contact with only the lower flanges 8 of the channel 6. Their inwardly dished body portions result in only line contact between the rollers and the body portions 7 of the channels 6. However, should the rollers be pulled upwardly they will have rolling contact engagement with the upper flanges 9 of the channels 6.

A washer 21' is interposed between the inner end of the hub 19 of each roller and the adjacent portion of the extension 16.

As will be seen from Figure 2, the front tracks T and the rear tracks T' are disposed at different angles to the horizontal so that the seat is tilted rearwardly more when it is pushed back to its rearmost adjustment and similarly is tilted less when it is pushed forwardly as far as it may be.

Hence, when the seat is pushed rearwardly it is tilted rearwardly so that the driver may occupy a reclining position for country driving. On the other hand, when the seat is pushed forwardly the rearward tilting of its back is less so that the driver may occupy an erect position for city driving. The extent to which the seat is tilted may be varied by changing the inclination of the channels 6 with respect to the floor rail F. This can be readily done when the device is assembled. It is not necessary to have each channel 6 of different construction and consequently it is not necessary to provide new dies or new tools.

The equalizer E provided between the two mounting units M comprises a shaft 25 extending transversely between and having its ends journaled in bearings 26 provided therefor in the adjacent flanges 15 of the two seat rails. Adjacent each bearing 26 a pinion 28 is pinned as at 29 to the shaft 25. The pinions 28 mesh with racks 30 which may be conveniently formed in the upper flange 9 of one of the channels 6. Obviously the rack may be a separate member suitably secured in position.

It is obvious that the shaft 25, pinions and racks constrain the seat rails at each side to partake of corresponding movement and prevents angling or canting of these members and of the seat.

Latching means designated generally at L is provided for releasably securing the seat in any one of a number of adjusted positions. The latch L comprises a latch bar 35 having a handle 36 integral therewith. The latch bar extends through slots 37 and 38 provided in the depending flanges 14 and 15 respectively of the seat rail U. The inner end of the latch bar has a notch 39 on its underside which straddles the lower margin of the slot 38. The portion of the latch bar adjacent the flange 14 of the channel 12 is provided with a notch 40 at its upper edge. A latch spring designated generally at 41 is cooperable with the latch bar to bias it into engagement with a toothed keeper plate 42 riveted to the outer flange 5 of the channel 2 of the floor rail with which the latch is associated. The spring has a U-shaped central portion 43 the body of which bears in the notch 40. Integral with the legs of the U-shaped portion 43 of the spring are coils 44. The outer terminals of the coils 44 have spring arms 45 integral therewith and the extremities of these arms are upturned as at 46 to engage in the opening provided therefor in the seat rails U.

With a latch of this construction the toothed keeper plate and the flange 14 are closely adjacent and consequently the stress of the latching action is taken by these parts and is not multiplied to any appreciable extent. The fulcrum of the latch bar is practically relieved of strain.

The structure thus far described is assembled in the manner shown in Figure 7, that is, the channels 6 are first riveted at one end to the floor rail R. The rollers 18 are assembled with their axles 17 on the seat rail U and are introduced into the upper ends of the channel 6 while the channels are in the inclined position shown in Figure 7. The parts are swung downwardly to their assembled position and the other ends of the channels 6 riveted in place on the floor rails.

In Figures 8 to 11 inclusive there is shown a simplified construction of a seat mounting embodying the present invention and while in these figures only one mounting unit is illustrated it is to be understood of course that two are employed with each seat in just the same manner as two are employed in the form of the invention shown in Figures 1 to 7.

In the mounting unit shown in Figures 8 to 11 the floor rail is replaced by supporting brackets 50 and 51 which rest on and are secured to floor boards of the vehicle. The vertical webs 52 of these brackets extend up between a pair of confronting channels 53 which like the channels 6 are designed to form an inclined track. The channels 53 are however, longer than the channels 6 since they serve both sets of rollers. For supporting the channels 53 on the brackets 52 rivets 54 are provided and have their ends riveted to the channels, their central portions supported in openings provided therefor in the webs 52 of the brackets 50 and 51 and their intermediate portions extending through spacing sleeves 55.

As in the other embodiment of the invention the mounting unit includes an upper rail or seat rail designated at U' which however, is in the form of a sheet metal angle 56 suitably secured to the bottom of the seat. The vertical web of the angle 56 has extensions 57 and 58 which extend down between the confronting channels 53 and which are apertured to receive axles 59 and 60. Rollers 61, similar in construction to rollers 18, are rotatably mounted on the ends of the axles and roll in the channels 53. Washers 62 are interposed between the rollers and the extensions 57 and 58.

A latch L is provided as before and the construction of the latch is identical with that previously described with the exception that the slot 37' therefor is formed in flange 63 integral with the angle 56 and the slot 38 therefor is provided in the vertical web of the angle.

The equalizer provided between the units also includes a shaft 25, and pinions 28, but the ends of the shaft are rotatably fitted in bearings 65 provided on strap brackets 66 riveted to one of the channels 53 and the pinions 28 mesh with a rack plate 68 interposed between the upper rail U' and the seat and conveniently secured in position by the same fastening devices which attach one of the upper rails to the seat.

The action of the equalizer just described is fundamentally the same as that employed with the form of the invention shown in Figures 1 to 7 although in the equalizer construction shown in Figures 8 and 9 the shaft axis remained stationary but the pinions pinned to the shaft coact with the traveling racks which move with the upper or seat rails to bring about an equalized movement of the seat rails of the two mounting units.

In both forms of the invention the advantage of eliminating any metal to metal sliding contact of the supporting elements of the mounting units is had. Normally the rollers 18 or 61, as the case may be, ride on the lower flanges of their channel shaped track members. However, should the seat be so tilted or moved as to bring the rollers into engagement with the upper flanges of their channel track members then these rollers will have rolling contact with such upper flanges. Both embodiments of the invention incorporate the same novel features and realize the same advantages in respect to the latching means of the equalizer.

In addition, in the embodiment shown in Figures 1 to 7 the structure provides for the tilting of the seat and yet it accomplishes this in such a practical manner as to make it possible to tilt the seat to different angles without incurring any materially increased manufacturing cost. The angle to which the seat is tilted is determined by the relative angular position of the tracks T and T'. When the mounting units are assembled this may be readily changed simply by changing the point at which these track members are riveted to their floor rail. It is not necessary to make new tools or dies.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A vehicle seat mounting of the character described comprising an upwardly opening channelshaped floor rail, separate front and rear pairs of confronting channels fastened to the vertical flanges of the channelshaped floor rail and disposed at different angles to the horizontal, a seat rail adapted to be secured to the seat and having extensions disposed between the confronting channels, and rollers rotatably supported on the extensions and having rolling contact with flanges of the confronting channels.

2. A vehicle seat mounting of the character described comprising cooperable seat and floor rails interconnected for relative longitudinal movement, and a latching arrangement for releasably securing the rails in various relative longitudinal positions, said latching arrangement including a latching bar fulcrumed on one of the rails, said last named rail having a slot in which a portion of the bar spaced from its fulcrum is supported for movement, a keeper having a portion disposed adjacent said slot and formed with a plurality of keeper slots, a spring for biasing the latching bar to latching position and having a U-shaped portion, said latch bar having a notch in which the transverse member of the U-shaped portion is engaged, coils integral with the ends of the U-shaped portion and having arms formed with upturned ends, the adjacent rail having openings with which the upturned ends of the arms are interengaged.

3. A vehicle seat mounting of the character described comprising a track made up of sheet metal channels disposed in closely spaced, confronting, parallel relation, means coacting with the end portions of the channels for supporting them and rigidly maintaining them in said relation, a seat rail having vertical web portions extending down between the confronting channels, and rollers rotatably supported on the web portions and normally having rolling contact with the lower flanges only of the channels but being adapted to have rolling contact with the upper flanges thereof when moved upwardly.

4. A vehicle seat mounting of the character described comprising a track made up of sheet metal channels disposed in closely spaced, confronting, parallel relation, means coacting with the end portions of the channels for supporting them and rigidly maintaining them in said relation and including supporting members adapted to be mounted on the vehicle, and rivets and spacing sleeves interconnecting said channels and said supporting members, a seat rail adapted to be secured to the seat and having portions extending down between the confronting channels, and rollers rotatably supported on said portions and normally having rolling contact with the lower flanges only of the channels but being adapted to have rolling contact with the upper flanges thereof when moved upwardly.

5. A vehicle seat mounting of the character described comprising a track made up of sheet metal channels disposed in closely spaced, confronting, parallel relation, brackets adapted to be mounted on the vehicle and having vertical web portions extending up between the end portions of the channels, rivets and spacing sleeves coacting with the channels and with the vertical web portions of the brackets for supporting the channels on the brackets and maintaining them in said relation, said rails being adapted to be secured to the seat and having depending portions extending down between the confronting channels, rollers rotatably mounted on said depending portions and normally having rolling contact with the lower flanges only of the channels but being adapted to have rolling contact with the upper flanges thereof when moved upwardly.

6. A vehicle seat mounting of the character described comprising a floor rail constituted of an upwardly opening sheet metal channel adapted to be mounted on the vehicle, a track made up of sheet metal channels disposed in confronting, parallel relation and having their body portions rigidly secured to the vertical flanges of the floor rail, a seat rail having depending portions disposed between said confronting channels, and rollers rotatably mounted on said depending portions and having rolling contact with flanges of the confronting channels.

7. A vehicle seat mounting of the character described comprising a floor rail constituted of an upwardly opening sheet metal channel adapted to be mounted on the vehicle, longitudinally spaced tracks supported on said channel and consisting of two pairs of sheet metal channels, each pair of channels being angled with respect to the horizontal, the members of each pair of channels being disposed in confronting parallel relation and having their body portions rigidly secured to the vertical flanges of the channel constituting the floor rail, a seat rail adapted to be secured to the seat and having depending portions disposed between said confronting channels, and rollers rotatably supported on said depending portions and normally having rolling contact with flanges of the confronting channels.

8. A vehicle seat mounting of the character described comprising a floor rail constituted of an upwardly opening sheet metal channel adapted to be mounted on the vehicle, longitudinally spaced tracks supported on said channel and consisting of two pairs of sheet metal channels, each pair of channels being angled with respect to the horizontal, the angularity of the rear pair of channels being different from that of the front pair of channels whereby the seat is tilted at different angles in its different fore and aft adjustments, the members of each pair of channels being disposed in confronting, parallel relation and having their body portions rigidly secured to the vertical flanges of the channel constituting the floor rail, a seat rail adapted to be secured to the seat and having depending portions disposed between said confronting channels, and rollers rotatably supported on said depending portions and normally having rolling contact with flanges of the confronting channels.

9. A vehicle seat mounting of the character described comprising cooperable seat and floor rails interconnected for relative longitudinal movement, and a latching arrangement for releasably securing the rails in various relative longitudinal positions, said latching arrangement comprising a latching bar, one of said rails having a vertical slot, a portion of said latching bar being in rocking contact with one end of said slot so as to be fulcrumed thereon, a keeper cooperably disposed with respect to said latching bar and having a plurality of keeper slots with which the latching bar is selectively engageable, and a spring combined with the latching bar to exert the dual function of maintaining it engaged with its fulcrum and biasing it to latching position.

10. A vehicle seat mounting of the character described comprising cooperable seat and floor rails interconnected for relative longitudinal movement, and a latching arrangement for releasably securing the rails in various relative longitudinal positions, said latching arrangement comprising a latching bar, one of said rails having a vertical slot, a portion of said latching bar being in rocking engagement with one end of said slot and fulcrumed thereon, said last named rail also having a second slot spaced transversely from said first named slot and with which said latching bar has guiding engagement, and a keeper having a portion disposed in closely adjacent relation to said last named slot, said keeper being formed with a plurality of keeper slots with which the latching bar is selectively engageable, and a spring combined with said last named rail and with said latching bar for exerting the dual function of maintaining the latching bar engaged with its fulcrum and biasing it to latching position.

11. A vehicle seat mounting of the character described comprising cooperable seat and floor rails interconnected for relative longitudinal movement, and a latching arrangement for securing the rails in various relative longitudinal positions, said latching arrangement comprising a latching bar extending transversely of said rails, one of said rails having transversely spaced slots through which said latching bar extends, said latching bar having a portion of its underside notched and interengaged with the lower ends of one of said slots, the upper side of said latching bar also having a notch transversely spaced from said first named notch, and a spring combined with said last named rail and with the notch on the upper side of said latching bar to maintain the notch on the underside of the latching bar in rocking engagement with the lower end of its slot and to bias the latching bar to latching position.

12. A vehicle seat mounting of the character described comprising a floor rail made up of longitudinally spaced track sections, each of said track sections comprising a pair of sheet metal channels disposed in closely spaced confronting parallel relation, the channels of the front track section being separate and longitudinally spaced from the channels of the rear track section, means for rigidly supporting the channels of the front and rear track sections at different angles to the horizontal, a seat rail adapted to be secured to the seat, and rollers rotatably supported on the seat rail and in rolling contact with the flanges of the channels.

13. A vehicle seat mounting of the character described comprising cooperable seat and floor rails interconnected for relative longitudinal movement and a latching arrangement for releasably securing the rails in various longitudinal positions, said latching arrangement comprising a straight latching bar, said seat rail being provided with a fulcrum with which a portion of the edge of the latching bar has rocking contact, a keeper secured in fixed relation to one of said floor rails, cooperably disposed with respect to said latching bar and having a plurality of slots with which said bar is selectively engageable, and a spring interposed and compressed between and positively interengaged with the bar and seat rail and serving the triple purpose of maintaining the latching bar engaged with its fulcrum, biasing it to latching position, and retaining itself assembled with the latching bar and seat rail.

14. A vehicle seat mounting of the character described comprising cooperable seat and floor rails interconnected for relative longitudinal movement, and a latching arrangement for releasably securing the rails in various relative longitudinal positions, said latching arrangement comprising a latching bar, one of said rails having a vertical slot, a portion of said latching bar being in rocking engagement with one end of said slot and fulcrumed thereon, said last named rail also having a second slot spaced transversely from said first named slot and with which said latching bar has guiding engagement, and a keeper secured in fixed relation to one of said floor rails and having a portion disposed in closely adjacent relation to said last named slot and formed with a plurality of keeper slots with which the latching bar is selectively engageable.

SWIFT MILLER.